(12) United States Patent
Minagawa et al.

(10) Patent No.: US 7,444,581 B2
(45) Date of Patent: Oct. 28, 2008

(54) ERROR HANDLING OF STORAGE DEVICE DATA IN REAL TIME SYSTEMS

(75) Inventors: Yusuke Minagawa, Ibaraki (JP); Satoru Yamauchi, Ibaraki (JP)

(73) Assignee: Texas Instruments Incorporated, Dallas, TX (US)

( * ) Notice: Subject to any disclaimer, the term of this patent is extended or adjusted under 35 U.S.C. 154(b) by 520 days.

(21) Appl. No.: 10/983,135

(22) Filed: Nov. 4, 2004

(65) Prior Publication Data

US 2005/0144542 A1    Jun. 30, 2005

Related U.S. Application Data

(60) Provisional application No. 60/517,617, filed on Nov. 4, 2003.

(51) Int. Cl.
*G11C 29/00* (2006.01)
(52) U.S. Cl. .................................... 714/769
(58) Field of Classification Search .................. 714/769
See application file for complete search history.

(56) References Cited

U.S. PATENT DOCUMENTS

| | | | | | |
|---|---|---|---|---|---|
| 4,292,684 A | * | 9/1981 | Kelly et al. | ................. | 714/764 |
| 5,003,541 A | * | 3/1991 | Mester | ....................... | 714/767 |
| 5,142,537 A | * | 8/1992 | Kutner et al. | ............... | 714/747 |
| 5,353,059 A | * | 10/1994 | Lawlor et al. | .......... | 375/240.11 |
| 5,901,159 A | * | 5/1999 | Ichikawa | .................... | 714/765 |
| 6,009,227 A | * | 12/1999 | Inoue | .......................... | 386/52 |
| 6,430,723 B2 | * | 8/2002 | Kodama et al. | ............. | 714/770 |

* cited by examiner

*Primary Examiner*—Joseph D Torres
(74) *Attorney, Agent, or Firm*—Robert D. Marshall, Jr.; W. James Brady; Frederick J. Telecky, Jr.

(57) ABSTRACT

A storage device performs error correction for all data read from media. Correctly read data or data that is corrected following the reading is transferred to a host for use. If the error correction fails, the storage device transfers a unique error code. The host distinguishes the received data between normal one and unique one. The normal data flows into main data handling routine and the unique code flows into error data handling routine. The processed results of both data are stored into system memory area in the host. The host controls the read out schedule and response to the unique code. This method can prevent the host breakdown from data trouble in the external storage device.

26 Claims, 3 Drawing Sheets

ERROR HANDLING OF STORAGE DEVICE DATA IN REAL TIME SYSTEMS

CLAIM OF PRIORITY UNDER 35 §119(e)(1)

This application claims priority under 35 U.S.C. §119(e)(1) from U.S. Provisional Application No. 60/517,617 filed Nov. 4, 2003.

TECHNICAL FIELD OF THE INVENTION

The technical field of this invention is error handling in data storage systems. This invention is related to a method for handling of error data on storage device which reads data from media that is hard to correct and is also uncorrected.

BACKGROUND OF THE INVENTION

In a system that including a commercial storage device and a host processor that processes data from the storage device, the system may break down if the storage device error correction fails. Generally such devices supply data to the host processor in this case as if the data were corrected. The prior art required the host processor to have a large circuit for error detection and correction.

SUMMARY OF THE INVENTION

In this invention when the storage device determines a failure of error correction for data from the media, it replaces the incorrect data with a unique code. The host processor recognizes this as error data. Thus the host processor knows the data is correct or incorrect before starting to process this data. This invention alerts the host processor and enables a low cost and small real time system.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
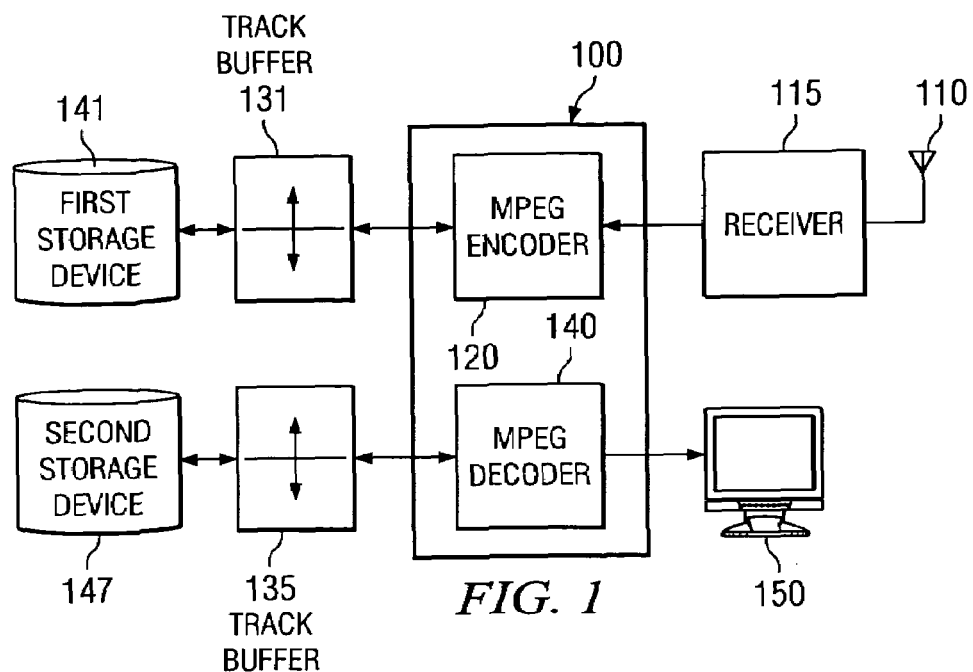
FIG. 1 illustrates a block diagram of a video system to which this invention is applicable.

FIG. 1 illustrates a consumer DVD/HDD hybrid recording system, the type system to which the invention is applicable. The heart of the system is MPEG codec LSI (large scale integrated circuit) 100. MPEG codec LSI 100 receives an input from a television signal source such as antenna 110 and receiver 115 for capturing a broadcast signal. MPEG encoder 120 encodes this input signal. The encoded signal is temporarily stored in track buffer 131. In the example illustrated in FIG. 1, track buffer 131 serves as a write buffer for first storage device 141. The example of FIG. 1 illustrates reading second storage device 145 with track buffer 135 serving as a read buffer. The read data, which has been previously MPEG encoded is decoded by MPEG decoder 140. The decoded signal is displayed via display 150. Note that this typical consumer device also handles corresponding audio tracks and that display 150 is assumed to include an audio system to render the audio tracks. In the typical consumer DVD/HDD hybrid recording system, first storage device 141 is a read/write magnetic fixed memory drive (HDD) and second storage device 147 is a read/write optical disk drive (DVD).

This invention is a method for handling error data on storage device when the data read from an inserted (or internal) media is hard to correct and correction fails. In real-time video and audio recording systems, storage devices such as DVD drives or hard disk drives (HDD) read out data from the media and perform error correction within the storage device. This error correction occurs for all data read from the media. This error correction can correct most code errors. But a physical or logical media defect sometimes causes the read data to have such serious errors that error correction fails. Because a streaming bit that guarantees accurate data transfer in real-time is active, the result of data error correction is transferred to the host processor as if the data were successfully corrected. This transfer is in spite the data actually being incorrect. The host processor thus regards the received data as corrected data and proceeds with its usual internal data processing. This kind of problem may cause an unexpected state such as hang-up or display trouble. The inventors expect this kind of problem will occur more and more frequently because market of DVD/HDD recorder grows larger. More and more people including kids and seniors will use these systems. These people may damage the recording medium due to their inexperience in handling the medium such as a DVD disc. In prior art this problem is addressed by making the host processor compatible with erroneous data. This requires robust error detection at the expense of consumption of processing power and larger circuit size.

Figure 2:
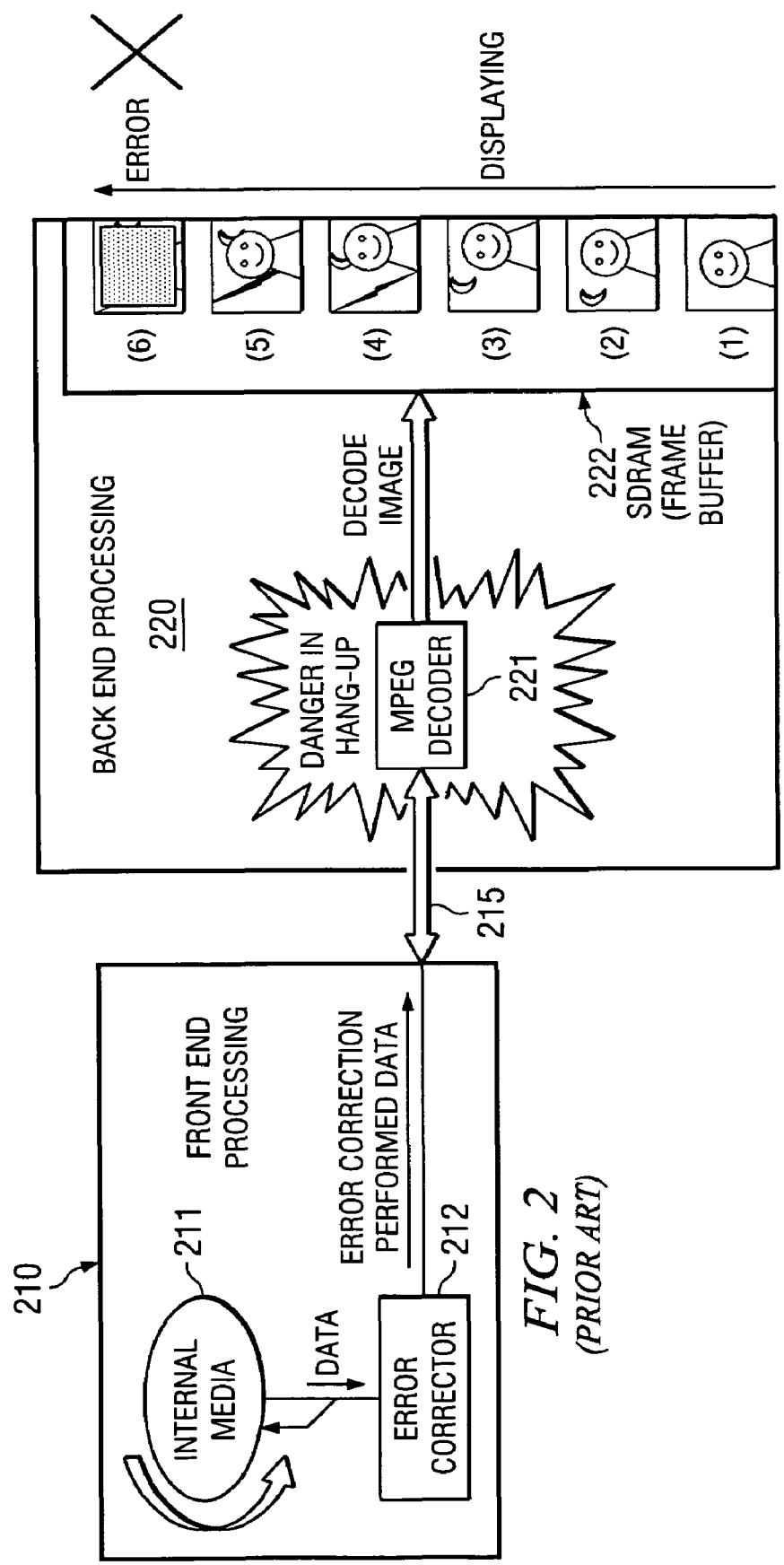
FIG. 2 illustrates a block diagram of a prior art system illustrating the problem solved by this invention.

FIG. 2 illustrates a block diagram of a prior art video system. The video system includes front end processing 210 and back end processing 220. In FIG. 2, front end processing 210 includes the storage device and back end processing 220 includes the host processor that controls the front end. Front end processing 210 including the media reader 211 and error correction circuitry 212. All data read via media reader 211 is checked for errors by error correction circuitry 212. The corrected data is transmitted to back end processing 220 via bus 215. Back end processing 220 includes MPEG (Motion Picture Expert Group) decoder 221 and synchronous dynamic random access memory (SDRAM) 222 serving as a frame buffer. MPEG decoder 221 decodes the data received from back end processing 210 via bus 215 from a data compressed format to a native pixel format. MPEG decoder 221 supplies a decoded image consisting of these decoded pixels to SDRAM frame buffer 222. FIG. 2 illustrates exemplary frames 1 to 6, with frame 6 including an uncorrected data error.

No matter what the result of error correction by error correction circuitry 212, the data after error correction is transferred to back end processing 220 as if all of the data were correct. The host cannot recognize the existence of error code from the transferred data. Only after MPEG decoding is carried out, can the host processor be sure of existence of error code in the transferred data from the storage device. Data errors may manifest themselves by MPEG decoder 221 rejecting the data due to being out of Huffman table. Upon detection of this event, the host processor can regard the data as erroneous. This is serious problem because it may cause system break down.

This invention operates differently upon detection of a failure of error correction. When error correction of data read from the media occurs, the front end processing 210 replaces the erroneous data with a specific and unique data. This specific and unique data signals the existence of an error in the transferred data. Thus the host processor can recognize erroneous data before starting data processing. The host processor can process other received data as usual because the unique code distinguishes between correct data and erroneous data.

Figure 3:
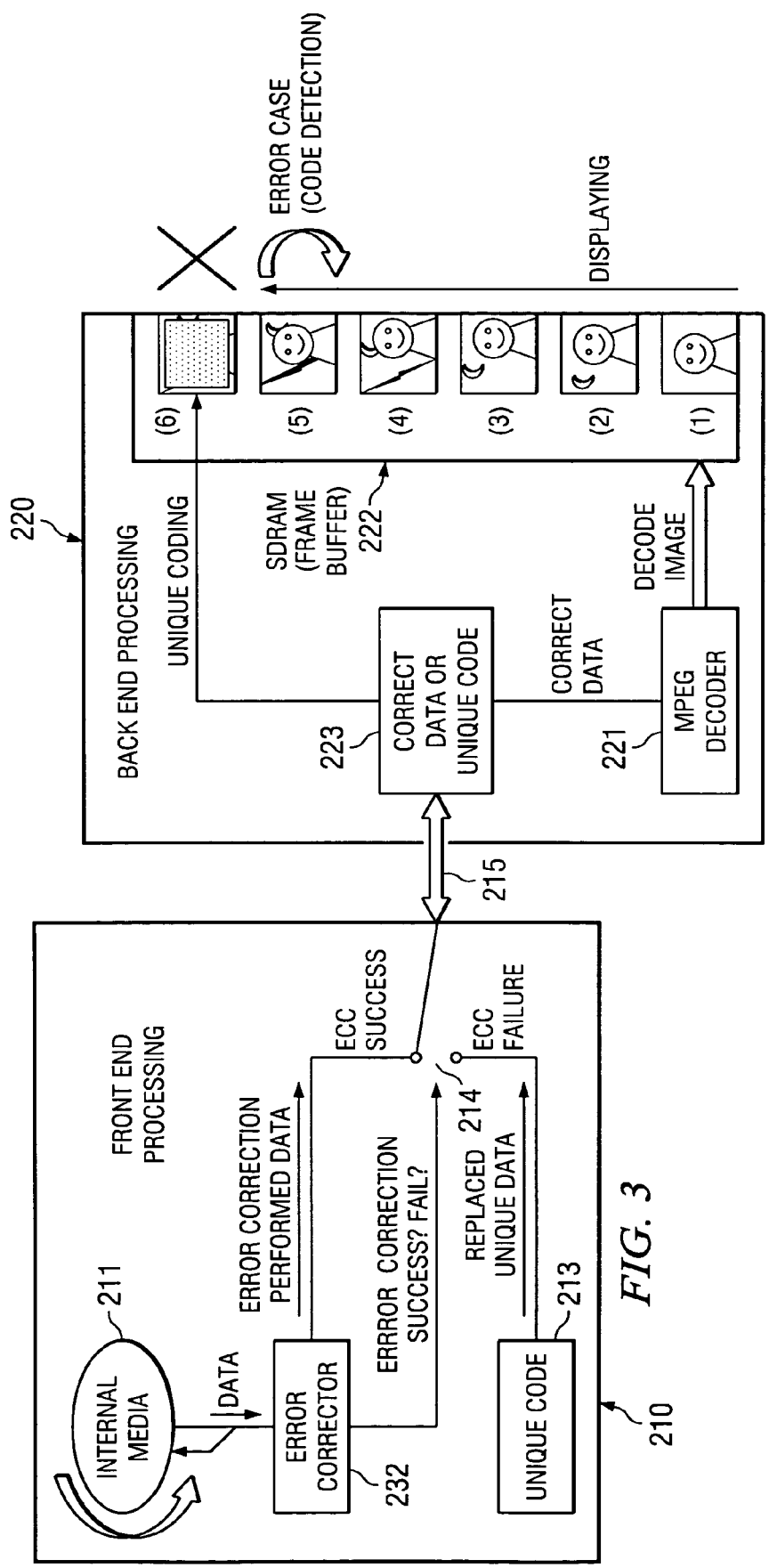
FIG. 3 illustrates a block diagram of a system employing this invention.

FIG. 3 illustrates a block diagram of this invention. The system includes front end processing 210 and back end processing 220. Front end processing 210 includes the media reader 211, modified error correction circuitry 232, unique code circuit 213 and switch 214. Modified error correction circuitry 232 includes two outputs; corrected data supplied to one pole of switch 214 and error correction fail signal controlling the switch position of switch 214. When modified error correction circuit 232 transmits correct data, including erroneously read data that is corrected, this data is supplied to one pole of switch 214. The error correction fail signal controls switch 214 to select this correct data read by media reader 211. This correct data is supplied to back end processing 220 via bus 215. In the other case, suppose modified error correction circuit 232 determines that data read via media reader 211 is so corrupted that it cannot be corrected. In this event, error correction fail signal controls switch 214 to select the other pole of switch 214. This other position of switch 214 receives a unique code from unique code circuit 213. Unique code circuit 213 generates a unique code not used by normal data that indicates a failure of error correction. Switch 214 selects this unique code signal for supply to back end processing 220 via bus 215.

Back end processing 220 is modified with the addition of correct data or unique code detector 223. Correct data or unique code detector 223 receives data from back end processing 210 via bus 215. Correct data or unique code detector 223 checks all incoming data for the unique code of unique code circuit 213. If correct data or unique code detector 223 does not detect the unique code, then the received data is correct. Accordingly, correct data or unique code detector 223 supplies this correct data to MPEG decoder 221. MPEG decoder 221 handles this data by decoding it into pixels and storing the resulting picture frames in SDRAM frame buffer 222.

If correct data or unique code detector 223 detects the unique code, then this marks a failure in error correction. Correct data or unique code detector 223 signals the host processor which goes into an error data handling routine. This unique code is not transmitted to MPEG decoder 221.

A practical example of the operation of this invention is written below:

(1) Host processor requests data from the storage device.

(2) The storage device reads data from the media, and performs error correction on all data.

(3) If the error correction is carried out successfully, the result data is transferred to the host processor. But if error correction fails, the storage device replaces the result data with a unique code that the host processor can recognize as indicating the data includes uncorrected errors. This unique data is transmitted instead of the packed data that is the unit of transferred data for DVD navigation information.

(4) The host processor distinguishes the received data as the correct data or the unique code. If the host processor recognizes correct data, then the host processor transfers the data to a main data handling routine, such as an MPEG decoder section. If the host processor recognized the unique code, then the host processor goes into an error data handling routine and does not send the data to the MPEG decoder section.

(5) The host processor stores the processed result in a system memory area. The host processor is aware of the stored address that would have received the uncorrected data but for receipt of unique code.

(6) The host processor reads out the data stored in the system memory area for display. When reading out from the address corresponding to the uncorrected erroneous data noted in above (5) (this is frame 6 data as illustrated in FIG. 3), the host processor reads out the prior frame data (frame 5 illustrated in FIG. 2) repetitively for video data. This continues until later correct frame data is found. For audio data the host processors mutes the audio output until the next correct audio data is found.

Figure 4:
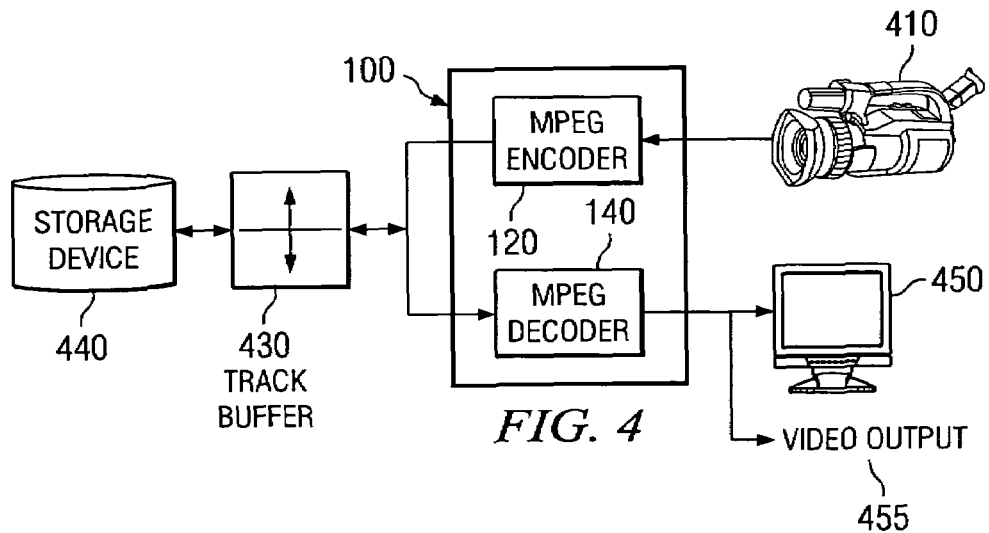
FIG. 4 illustrates the components of a digital camcorder to which this invention is applicable.
Figure 5:
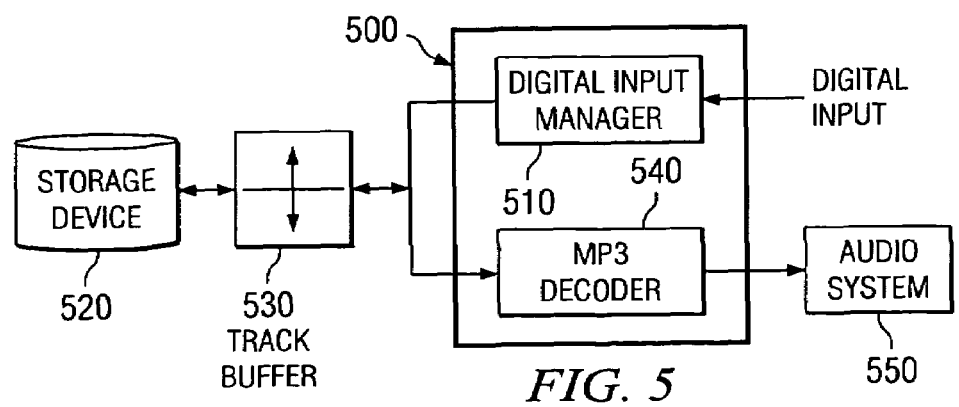
FIG. 5 illustrates the components of a portable compressed music system to which this invention is applicable.

FIGS. 4 and 5 illustrate additional application devices whose performance can be improved by this invention. FIG. 4 illustrates the components of a digital camcorder that includes MPEG codec LSI 100 previously described. Digital camera 410 captures sequential views of a scene and supplies the digital data to MPEG encoder 120. MPEG encoder 120 encodes these sequential views as frames and compresses this data for storage on storage device 440 via buffer 430. This enables storage of video captured by camera 410. Upon playback storage device 440 recalls encoded data and supplies it to MPEG decoder 140 via buffer 430. MPEG decoder 140 decompresses the encoded and compressed data and generates a video output suitable for internal viewer 450. MPEG decoder 140 also generates video output 455 for use by an external device such as an external display.

In a typical digital camcorder such as illustrated in FIG. 4, storage device 440 is a read/write DVD drive or a digital tape drive. Each of these storage devices are subject to media damage that causes data errors as previously discussed. In addition, each of these storage devices in a digital camcorder are subject to vibration and shock which can also cause errors of the type described above. Accordingly, the error detection technique of this invention is useful in digital camcorders.

FIG. 5 illustrates the components of a portable compressed music system including LSI 500. The portable compressed music system receives digital inputs at digital input manager 510. In the typical portable music system, this digital input would be in a compressed music format such as MPEG Layer 3 Audio, commonly known as MP3. Generally this digital input would be transmitted from a personal computer. Digital input manager 510 causes this digital input to be stored on storage device 520 via buffer 530. Upon playback, storage device 520 recalls digital data corresponding to a music selection and supplied it to MP3 decoder 540 via buffer 530. MP3 decoder 540 decodes and decompresses the data recalled from storage device 520. MP3 decoder 540 supplies this data to audio system 550. Audio system 550 includes digital to analog converters and audio amplifiers to drive a set of personal headphones for listening to the music stored on storage system 520.

The typical portable compressed audio system such as illustrated in FIG. 5 employs a fixed disk drive (often also called hard disk drive) for storage device 520. In a portable system storage device 520 is prone to data errors due to vibration and shock of the portable compressed music system. Accordingly, the error detection technique of this invention is useful in portable compressed music systems.

In this invention, the host processor knows of error in transferred data before main processing of the data. This is very favorable for real-time systems because the system has to read out the result data of internal processing continuously in real time.

What is claimed is:

1. A storage device comprising:
a media reader for reading data stored on media;
an error correction circuit connected to said media reader for detecting and attempting to correct errors in data read from said media, said error correction circuit having a first output for said corrected data and a second output indicating whether said error correction succeeded or failed;
a unique code circuit generating a unique code differing from all corrected data; and
a switch having a first input receiving said corrected data output from said error correction circuit, a second input connected to said unique code circuit receiving said unique code, a control input receiving said second output of said error correction circuit and an output, said switch coupling said first input to said output if said control input indicates said error correction succeeded and coupling said second input to said output if said control input indicated said error correction failed.

2. The storage device of claim 1, wherein: said media is a removable media.

3. The storage device of claim 2, wherein: said media is a DVD.

4. A data processing apparatus comprising:
an input receiving data consisting of one of data for processing or a unique code differing from all correct data and indicating failure of error correction;
a data utilization device having a data input and capable of utilizing data received at said data input;
a unique code detector connected to said input and receiving said data, and connected to said input of said data utilization device, said unique code detector
detecting receipt of said unique code at said input,
supplying data received at said input to said input of said data utilization device in the absence of detection of said unique code at said input, and
not supplying data received at said input to said input of said data utilization device upon detection of said unique code at said input.

5. The data processing apparatus of claim 4, wherein:
said data consists of coded video data;
said utilization device including a decoder for decoding said coded video data into a series of video frames.

6. The data processing apparatus of claim 5, further comprising:
a frame buffer connected to said decoder for storing said video frames; and
said utilization device further
recalling video frames stored in said frame buffer for transmission to a display device for display, and
recalling a prior video frame and transmitting said prior video frame to said display device for display when input data corresponding to a current frame includes said unique code until input data for a next frame does not include said unique code.

7. The data processing apparatus of claim 4, wherein:
said data consists of coded audio data;
said utilization device including a decoder for decoding said coded video data into digital audio data.

8. The data processing apparatus of claim 7, further comprising:
a buffer connected to said decoder for storing said digital audio data; and
said utilization device further
recalling digital audio data stored in said buffer for transmission to a audio device for producing an audio output corresponding to said digital audio data, and
muting said audio device when input data includes said unique code until input data does not include said unique code.

9. An apparatus comprising:
a media reader for reading data stored on media;
an error correction circuit connected to said media reader for detecting and attempting to correct errors in data read from said media, said error correction circuit having a first output for said corrected data and a second output indicating whether said error correction succeeded or failed;
a unique code circuit generating a unique code differing from all corrected data;
a switch having a first input receiving said corrected data output from said error correction circuit, a second input connected to said unique code circuit receiving said unique code, a control input receiving said second output of said error correction circuit and an output, said switch coupling said first input to said output if said control input indicates said error correction succeeded and coupling said second input to said output if said control input indicated said error correction failed;
a data utilization device having a data input and capable of utilizing data received at said data input;
a unique code detector connected to said output of said switch and receiving said data, and connected to said input of said data utilization device, said unique code detector
detecting receipt of said unique code at said input,
supplying data received at said input to said input of said data utilization device in the absence of detection of said unique code at said input, and
not supplying data received at said input to said input of said data utilization device upon detection of said unique code at said input.

10. The apparatus of claim 9, wherein: said media is a removable media.

11. The apparatus of claim 10, wherein: said media is a DVD.

12. The apparatus of claim 9, wherein:
said data consists of coded video data;
said utilization device including a decoder for decoding said coded video data into a series of video frames.

13. The apparatus of claim 12, further comprising:
a frame buffer connected to said decoder for storing said video frames; and
said utilization device further
recalling video frames stored in said frame buffer for transmission to a display device for display, and
recalling a prior video frame and transmitting said prior video frame to said display device for display when input data corresponding to a current frame includes said unique code until input data for a next frame does not include said unique code.

14. The apparatus of claim 9, wherein:
said data consists of coded audio data;
said utilization device including a decoder for decoding said coded video data into digital audio data.

15. The apparatus of claim 14, further comprising:
a buffer connected to said decoder for storing said digital audio data; and said utilization device further
recalling digital audio data stored in said buffer for transmission to a audio device for producing an audio output corresponding to said digital audio data, and
muting said audio device when input data includes said unique code until input data does not include said unique code.

16. A method comprising the steps of: reading data stored on media;
detecting and attempting to correct errors in data read from said media, outputting said corrected data and indicating whether said error correction succeeded or failed;
generating a unique code differing from all corrected data; and
transmitting via an output bus said corrected data if said error correction succeeded and transmitting via said output bus said unique code if said error correction failed.

17. The method of claim 16, wherein:
said data consists of coded audio data;
said step of utilizing received data includes decoding said coded video data into digital audio data.

18. The method of claim 17, further comprising the steps of:
storing said digital audio data; and
recalling digital audio data or producing an audio output corresponding to said digital audio data; and
muting said audio output when input data includes said unique code until input data does not include said unique code.

19. A method comprising the steps of:
receiving data consisting of one of data for processing or a unique code differing from all correct data and indicating failure of error correction at an input;
detecting receipt of said unique code at said input;
utilizing received data received in the absence of detection of said unique code at said input; and
not utilizing received data received upon detection of said unique code at said input.

20. The method of claim 19, wherein:
said data consists of coded video data;
said step of utilizing received data includes said coded video data into a series of video frames.

21. The method of claim 20, further comprising the steps of:
storing said video frames;
recalling stored video frames for transmission to a display device for display; and
recalling a prior video frame and transmitting said prior video frame for display when input data corresponding to a current frame includes said unique code until input data for a next frame does not include said unique code.

22. A method comprising the steps of:
reading data stored on media;
detecting and attempting to correct errors in data read from said media, outputting said corrected data and indicating whether said error correction succeeded or failed;
generating a unique code differing from all corrected data stored;
transmitting via an output bus said corrected data if said error correction succeeded and transmitting via said output bus said unique code if said error correction failed;
receiving said transmitted data via said output bus consisting of one of data for processing or a unique code indicating failure of error correction;
detecting receipt of said unique code in said selected data;
utilizing received data received in the absence of detection of said unique code at said input; and
not utilizing received data received upon detection of said unique code at said input.

23. The method of claim 22, wherein:
said data consists of coded video data;
said step of utilizing received data includes said coded video data into a series of video frames.

24. The method of claim 23, further comprising the steps of:
storing said video frames;
recalling stored video frames for transmission to a display device for display; and
recalling a prior video frame and transmitting said prior video frame for display when input data corresponding to a current frame includes said unique code until input data for a next frame does not include said unique code.

25. The method of claim 22, wherein:
said data consists of coded audio data;
said step of utilizing received data includes decoding said coded video data into digital audio data.

26. The method of claim 25, further comprising the steps of:
storing said digital audio data; and
recalling digital audio data or producing an audio output corresponding to said digital audio data; and
muting said audio output when input data includes said unique code until input data does not include said unique code.

* * * * *